US010129127B2

(12) United States Patent
Lin (10) Patent No.: US 10,129,127 B2
(45) Date of Patent: Nov. 13, 2018

(54) SOFTWARE DEFINED NETWORK CONTROLLER, SERVICE FUNCTION CHAINING SYSTEM AND TRACE TRACKING METHOD (71) Applicant: NANNING FUGUI PRECISION INDUSTRIAL CO., LTD., Nanning (CN)

(72) Inventor: Shih-Neng Lin, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 15 days.

(21) Appl. No.: 15/427,230

(22) Filed: Feb. 8, 2017

(65) Prior Publication Data
US 2018/0227209 A1 Aug. 9, 2018

(51) Int. Cl.
*H04L 12/26* (2006.01)
*H04L 12/24* (2006.01)
*H04L 12/741* (2013.01)
*H04L 12/707* (2013.01)
*H04L 29/12* (2006.01)

(52) U.S. Cl.
CPC ............. *H04L 43/10* (2013.01); *H04L 41/12* (2013.01); *H04L 43/045* (2013.01); *H04L 43/06* (2013.01); *H04L 45/24* (2013.01); *H04L 45/54* (2013.01); *H04L 61/251* (2013.01); *H04L 61/256* (2013.01); *H04L 61/6004* (2013.01); *H04L 61/6059* (2013.01)

(58) Field of Classification Search
CPC ..... H04L 41/0631; H04L 43/10; H04L 43/04; H04L 45/02; H04L 45/28; H04L 45/42; H04L 45/48; H04L 61/251
See application file for complete search history.

(56) References Cited

U.S. PATENT DOCUMENTS

| 9,912,566 B1* | 3/2018 | Penno | H04L 43/10 |
| 2015/0244617 A1* | 8/2015 | Nakil | G06F 9/45558 709/224 |
| 2016/0105336 A1* | 4/2016 | Sinha | H04L 43/10 709/224 |

* cited by examiner

*Primary Examiner* — Mewale Ambaye
(74) *Attorney, Agent, or Firm* — ScienBiziP, P.C.

(57) ABSTRACT

In a service function chaining (SFC) system, which comprises an SFC module and a software defined network (SDN) controller, the SDN controller generates a trace packet. The trace packet is classified by the SFC module, the SDN controller comprises a trace managing module, and the trace managing module determines whether equal cost multipath (ECMP) arrangement exists according to the classified trace packet. The trace managing module creates duplicate trace packet flow but keeps only one trace packet at next link in the chaining when that the ECMP arrangement is determined to exist in one SFF. Trace managing module creates normal and dropped trace packet flows and keeps only one trace packet at next link when existence of ECMP in different service function forwarders is determined. Thus, a client can identify failed trace through the trace packet upon trace failure. An SDN controller and trace tracking method are also provided.

20 Claims, 11 Drawing Sheets

| SFPID | Trace ID | SFF IP | SF | SF IP | State | NI |
|---|---|---|---|---|---|---|
| 28 | 1 | 10.0.1.31 | FW | 10.0.1.32 | OK | 1 |
| 28 | 1 | 10.0.1.41 | $DPI^1$ | 10.0.1.42 | OK | 2 |
| 28 | 1 | 10.0.1.45 | $DPI^2$ | 10.0.1.46 | OK | 2 |
| 28 | 1 | 10.0.1.51 | IPS | 10.0.1.61 | Fail | 3 |

Flow Match:
Input Port=SFF tunnel port A
NSH header=SFPID 28, Trace
Action:
To SF port, To Controller table 1

Flow Match:
Input Port=SF port
NSH header=SFPID 28, Trace
Action:
To Controller, To SFF tunnel port B table 2

Flow Match:
Input Port=SFF tunnel port A
NSH header=SFPID 28, Trace
Idle Timeout
Action:
To Controller, Drop table 3

SOFTWARE DEFINED NETWORK CONTROLLER, SERVICE FUNCTION CHAINING SYSTEM AND TRACE TRACKING METHOD

FIELD

The subject matter herein generally relates to network communications.

BACKGROUND

Sometimes an equal cost multipath (ECMP) arrangement exists in a service function chaining (SFC). When a trace failed, a client cannot find out the identity of the failed trace.

BRIEF DESCRIPTION OF THE DRAWINGS

Implementations of the present disclosure will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

The present disclosure is described in relation to a service function chaining (SFC) system and a trace tracking method. When an equal cost multipath (ECMP) arrangement exists in one SFC and one trace fails, a client can identify the failed trace.

Figure 1:
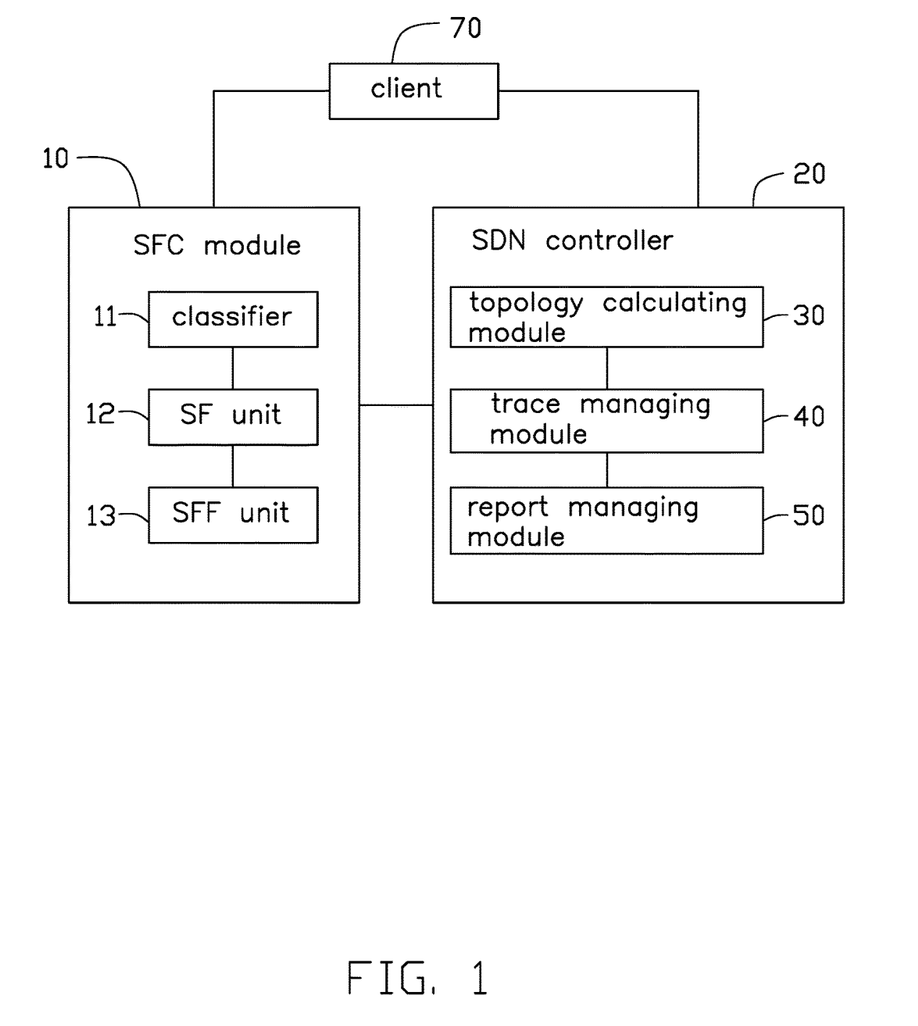
FIG. 1 is a block diagram of one exemplary embodiment of an SFC system.

FIG. 1 illustrates an exemplary embodiment of a service function chaining (SFC) system. The SFC system comprises an SFC module 10 and a software defined network (SDN) controller 20. The SFC module 10 communicates with the SDN controller 20 through network connections. Data transmission is between the SFC module 10 and the SDN controller 20 through the network connections. The SDN controller 20 is configured to generate a trace packet when receiving a trace request triggered by a client 70. The trace packet is a data packet which is predetermined by the SDN controller 20. The predetermined trace packet can be identified by the SDN controller 20. In one exemplary embodiment, the client 70 may be a computer or a mobile phone.

The SDN controller 20 comprises a topology calculating module 30, a trace managing module 40, and a report managing module 50. The topology calculating module 30 connects to the trace managing module 40. The trace managing module 40 connects to the report managing module 50.

The SFC module 10 comprises a classifier 11, a service function (SF) unit 12, and a service function forwarder (SFF) unit 13. The classifier 11 connects to the SF unit 12. Data transmission is between the classifier 11 and the SF unit 12 through the network connections. The SF unit 12 connects to the SFF unit 13. Data transmission is between the SF unit 12 and the SFF unit 13 through the network connections.

The service function can deal with the received data packet in specific ways. The service function may be a firewall (FW) defence, a wide area network (WAN) device accelerator, and a deep packet inspection (DPI). The SFF unit 13 applies forwarding controls for the service function chaining. In one exemplary embodiment, the flows of the service function chaining comprises a duplicate trace packet flow, a dropped trace packet flow, a normal trace packet flow, and a trace report flow.

The SFC module 10 defines a log or abstract of a plurality of service functions arranged in order (abstract ordered collection). The data packet classified by the classifier 11 traverses the plurality of service functions in the abstract ordered collection. In one exemplary embodiment, a user can configure firewall->DPI->internet protocol suite (IPS) to build one service function chaining.

The classifier 11 is configured to encode the received trace packet and add a network service header (NSH) to the trace packet. The classifier 11 is further configured to send the trace packet having the NSH to the service function forwarder connected to the classifier 11. Information is contained in the NSH, such as the service function chaining which the trace packet passes through and the number of links or hops of the service function chaining. The trace packet is sent to the service function or next hop service function forwarder by the service function forwarder when passing through the service function forwarder, until the end of the service function chaining is reached.

The SF unit 12 comprises at least one service function. The SFF unit 13 comprises at least one service function forwarder.

The topology calculating module 30 is configured to provide a plurality of service function path (SFP) forwarding policy tables by means of calculations. The service function forwarder stores the plurality of forwarding policy tables. Each service function forwarder corresponds to one forwarding policy table.

Figure 2:
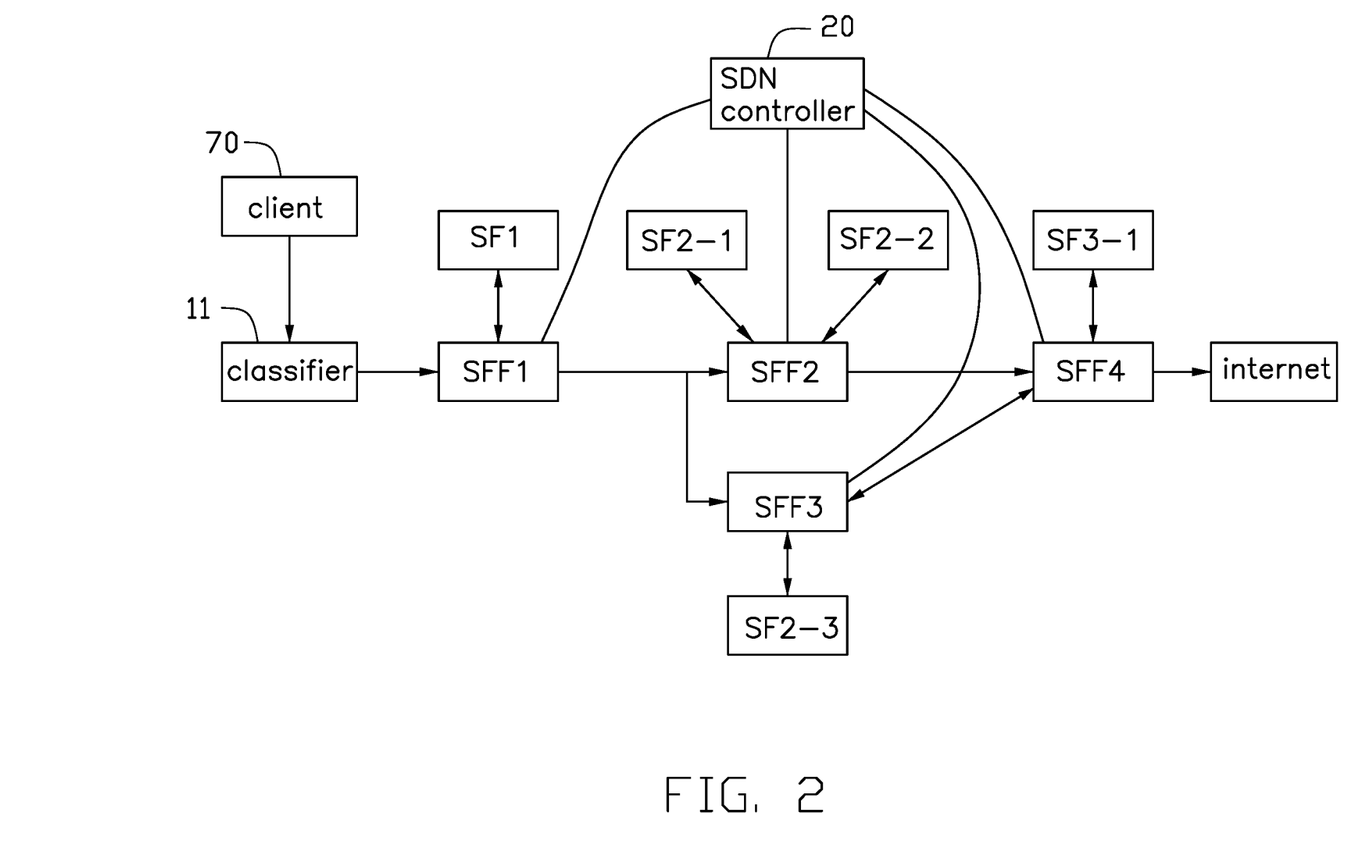
FIG. 2 is a diagrammatic view of a first exemplary embodiment of the SFC system of FIG. 1.

FIGS. 1-2 illustrate that the SF unit 12 comprises four service function forwarders, namely an SFF1 located at a first hop, an SFF2 located at a second hop, an SFF3 located at the second hop, and an SFF4 located at a third hop. In the exemplary embodiment, the SF unit 12 comprises five service functions, namely, an SF1 corresponding to the SFF1, an SF2-1 and SF2-2 corresponding to the SFF2, an SF2-3 corresponding to the SFF3, and an SF3-1 corresponding to the SFF4. The classifier 11 communicates with the SFF1 through the network connections. The SFF1 communicates with the SF1, SFF2, and SFF3, through the network connections. The SFF2 communicates with the SF2-1, SF2-2, and SFF4, through the network connections. The SFF3 communicates with the SF2-3 and SFF4 through the network connections. The SFF4 communicates with the SF3-1 through the network connections.

The SFC module 10 is configured to send the trace packet classified by the classifier 11 to the trace managing module 40. The trace managing module 40 is configured to analyze data of the forwarding policy table. The trace managing module 40 determines whether an equal-cost multipath routing (ECMP) arrangement exists according to the NSH of the trace packet, the analyzing data of the forwarding policy table, and a calculating method. Specifically, the trace managing module 40 determines whether the ECMP arrangement exists in one service function forwarder or in different service function forwarders according to NHS information of the trace packet, the analyzing data of the forwarding policy table, and the calculating method.

In one exemplary embodiment, the NSH of the trace packet comprises version information, a length of the trace packet, protocol information (such as operations, administration, and maintenance (OAM) protocol), ECMP information (indicating if this trace should support ECMP), Trace ID (an identification of the trace packet), the SF state (a normal state or a failed state of the service function), a reserved bit, and a trace index (a trace index value).

FIG. 2 illustrates that, in the first exemplary embodiment, the SFF1 connects to the SFF2 through a first path and connects to the SFF3 through a second path. The trace managing module 40 thereby determines that the ECMP arrangement exists in the SFF1. The SFF2 connects to the SFF4 through a third path and the SFF3 connects to the SFF4 through a fourth path, and thereby the trace managing module 40 determines that the ECMP arrangement exists in the SFF2 and SFF3.

The trace managing module 40 is further configured to do copying and dropping of packets, and create a trace report when the ECMP arrangement is determined to exist. Specifically, when the trace managing module 40 determines that the ECMP arrangement exists, the trace managing module 40 creates duplicate trace packet flow or creates dropped trace packet flow, and creates the trace report. The trace managing module 40 further sends the trace report to the report managing module 50 according to the trace report flow. Further, when the trace managing module 40 determines that the ECMP arrangement exists in one service function forwarder, the trace managing module 40 creates the duplicate trace packet flow and dropped trace packet flow according to the data of the forwarding policy table. Thereby, the trace managing module 40 can copy a number of trace packets according to the number of service functions corresponding to the particular service function forwarder. For example, two trace packets are copied when one service function forwarder corresponds to two service functions. The trace managing module 40 drops extra trace packets, thereby enabling each service function corresponding to the particular service function forwarder to obtain only one trace packet, and to keep only one trace packet at next hop. When the trace managing module 40 determines that the ECMP arrangement exists in different service function forwarders, the trace managing module 40 creates the normal trace packet flow and dropped trace packet flow according to the data of the forwarding policy table. The trace managing module 40 can thus drop extra trace packets, so that each service function corresponding to the particular service function forwarder obtains only one trace packet and keeps only one trace packet at the next hop.

Figure 3:
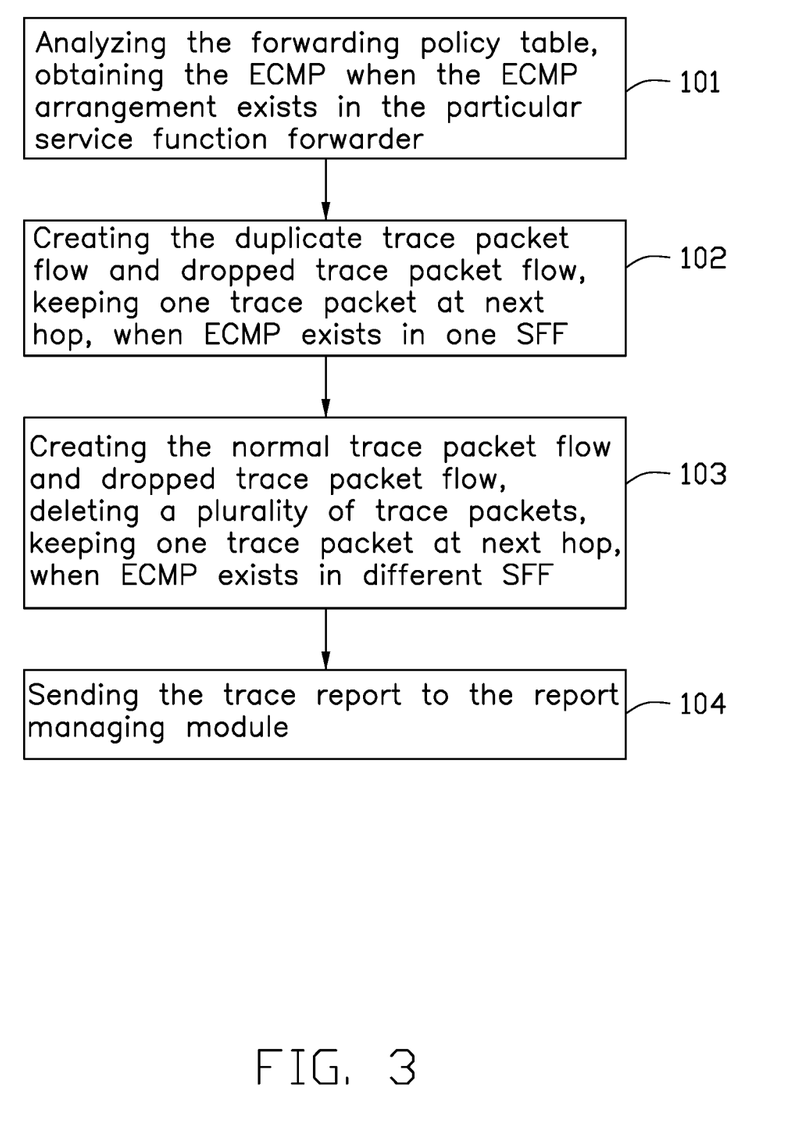
FIG. 3 is a flowchart of one exemplary embodiment of an ECMP-determining algorithm of a trace tracking method.

FIG. 3 illustrates a flowchart of a method in accordance with an example embodiment. An algorithm for determining the existence of an ECMP arrangement is provided by way of example, as there are a variety of ways to carry out the method. The ECMP-determining algorithm described below can be carried out using the configurations illustrated in FIGS. 1-2, for example, and various elements of these figures are referenced in explaining the ECMP-determining algorithm. The illustrated order of blocks is by example only and the order of the blocks can change. Additional blocks may be added or fewer blocks may be utilized without departing from this disclosure. The ECMP-determining algorithm can begin at block 101.

At block 101, the trace managing module 40 analyzes the forwarding policy tables stored in the SFF, and obtains the ECMP when the ECMP arrangement exists in the particular service function forwarder. Specifically, the trace managing module 40 analyzes the data of the forwarding policy tables in the service function, and determines according to the data of the forwarding policy table. The trace managing module 40 determines the ECMP arrangement exists, and obtains the ECMP when the particular service function is determined to exist in the service function forwarder. In one exemplary embodiment, see FIG. 2, the forwarding policy tables corresponding to the SFF2 and SFF3 comprises information as follows: SFPID being 28 (indicating an identification of the service function path is 28), $SF^3$ being $IPS^1$ (indicating represents the $IPS^1$ is the $SF^3$ of the SFF4), and Loc [$SFF^4$, $IPS^1$] (indicating a location of the ECMP is the IPS1 corresponding to the SFF4 and SFF4).

At block 102, when the trace managing module 40 determines the ECMP arrangement exists in one particular service function forwarder, the trace managing module 40 creates the duplicate trace packet flow and dropped trace packet flow, and keeps one trace packet at the next hop.

At block 103, when the trace managing module 40 determines the ECMP arrangement exists in different service function forwarders, the trace managing module 40 creates the normal trace packet flow and dropped trace packet flow, drops extra trace packets from different service function forwarders, and keeps one trace packet at the next hop.

At block 104, each service function forwarder sends the trace report to the report managing module 50 according to the trace report.

In the determining ECMP existing algorithm of FIG. 3, the trace managing module 40 can copy a plurality of trace packets according to the number of the equal-cost paths through the duplicate trace packet flow, thereby enabling each path to transmit one trace packet. The trace packet is normally transmitted on the path through the normal trace packet flow. The trace managing module 40 can drop extra trace packets, thereby only one trace packet is transmitted on one path and keeping one trace packet at the next hop, according to the dropped trace packet flow.

Specifically, FIG. 2 illustrates that when the trace managing module 40 determines the ECMP arrangement exists in the SFF1, the trace managing module 40 copies two trace packets according to the created duplicate trace packet flow, thereby enabling the SFF1 transmits one of the two trace packets to the SFF2 through the first path and transmits the other trace packet to the SFF3 through the first path. When the trace managing module 40 determines the ECMP arrangement exists in the SFF2 and SFF3, the trace managing module 40 drops one of the two trace packets according to the created dropped trace packet flow, thereby enabling the trace packet from the SFF2 to be transmitted to the SFF4 through the third path or the trace packet from the SFF3 to be transmitted to the SFF4 through the fourth path.

Figure 4:
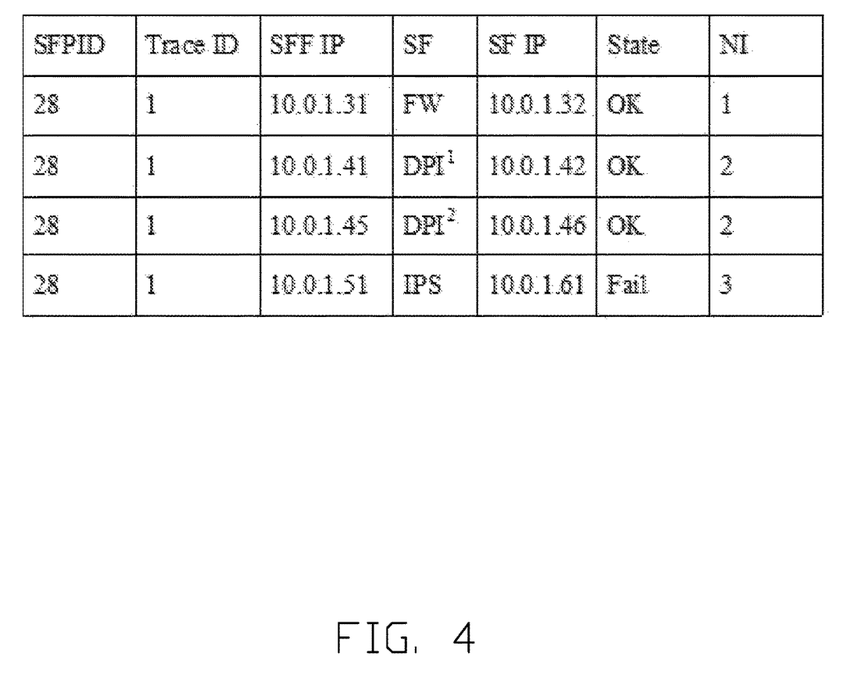
FIG. 4 is a graphic depiction of an aggregate trace table of the SFC system of FIG. 1.
Figure 5:
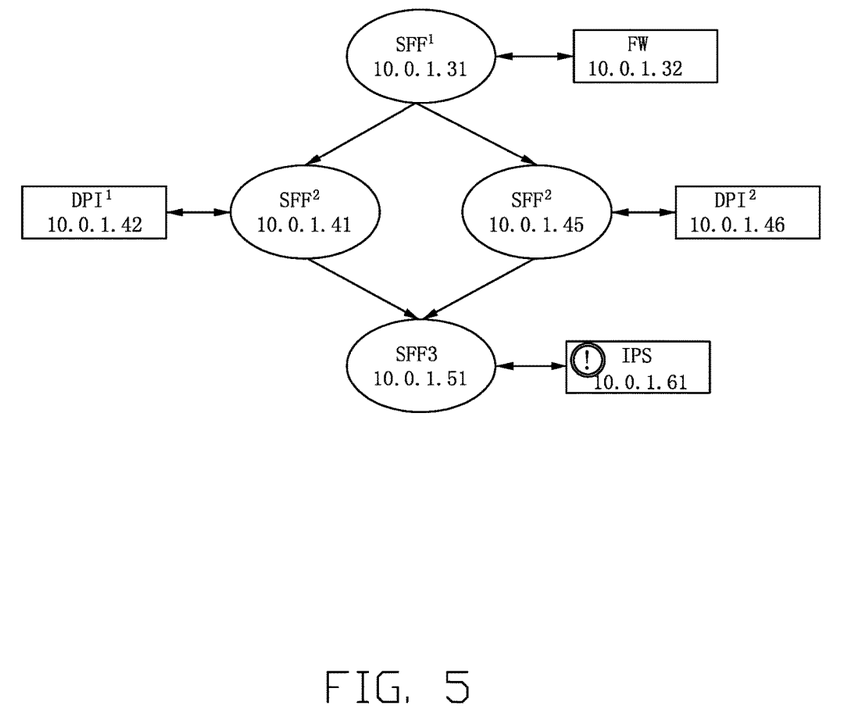
FIG. 5 is a graphic depiction of an SFC trace graph of the aggregate trace table of FIG. 4.

The report managing module 50 is configured to collect the trace report transmitted by the trace managing module 40. The report managing module 50 is also configured to generate an aggregate trace table according to the collected trace report. The report managing module 50 is further configured to generate an SFC trace graph according to the aggregate trace table. FIG. 4 illustrates that in one exemplary embodiment, in the aggregate trace table, the SFPID represents an identification of the service function path (SFP), Trace ID represents an identification of the trace packet, SFF IP represents an internet protocol (IP) address of the service function forwarder (SFF), SF represents the service function (SF), SF IP represents an IP address of the service function (SF), State represents a state of the service function or service function path, NI represents the hop. For example, in the exemplary embodiment, SFPID being 28 represents an identification of the service function path (SFP) is 28, Trace ID being 1 represents trace packet is the first trace packet, SFF IP being (10. 0. 1. 31) represents an IP address of the service function forwarder (SFF) is (10. 0. 1. 31), SF being FW represents corresponding to the service function (SF) is firewall, SF IP being (10. 0. 1. 32) represents an IP address of the service function (SF) is (10. 0. 1. 32), State being OK represents the states of the service function and service function path are normal, State being Fail represents at least one of the states of the service function and service function path is failed, NI being 1 represents a hop of the SFF1 is the first hop, NI being 3 represents a hop of the SFF3 is the third hop NI. FIG. 5 illustrates one SFC trace graph corresponding to the aggregate trace table of FIG. 4, and IPS is a failed state.

Figure 6:
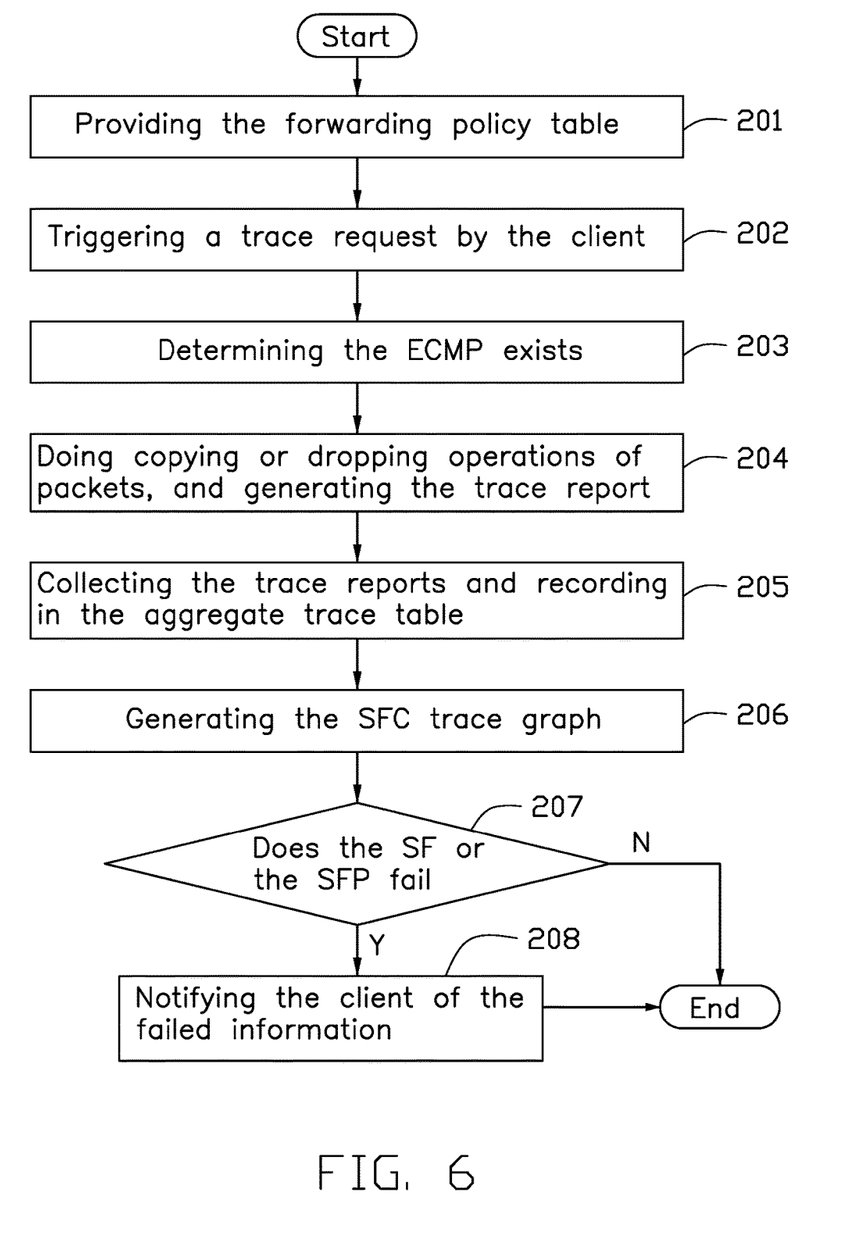
FIG. 6 is a flowchart of one exemplary embodiment of the trace tracking method.

FIG. 6 illustrates a flowchart of a method in accordance with an example embodiment. A trace tracking method is provided by way of example, as there are a variety of ways to carry out the method. The trace tracking method described below can be carried out using the configurations illustrated in FIGS. 1-5, for example, and various elements of these figures are referenced in explaining the trace tracking method. The illustrated order of blocks is by example only and the order of the blocks can change. Additional blocks may be added or fewer blocks may be utilized without departing from this disclosure. The trace tracking method can begin at block 201.

At block 201, the topology calculating module 30 provides the forwarding policy tables through calculating.

At block 202, a trace request triggered by the client 70, thereby the SDN controller 20 generates one trace packet and sets a service function chaining path according to the trace request.

At block 203, the trace managing module 40 determines the ECMP arrangement exists in the SFC module 10 through calculating.

At block 204, the trace managing module 40 does operations of copying and dropping, and generates the trace report. Specifically, when the trace managing module 40 determines the ECMP arrangement exists in the SFC module 10, the trace managing module 40 creates the duplicate trace packet flow and dropped trace packet flow, creates the trace report, and sends the trace report to the report managing module 50 through the trace report. Further, the ECMP arrangement is determined to exist in one particular service function forwarder, the trace managing module 40 creates the duplicate trace packet flow and dropped trace packet flow according to the data of the forwarding policy table, thus, the trace managing module 40 can copy a number of trace packets according to the number of service functions corresponding to the particular service function forwarder, and drop extra trace packets, thereby enabling each service function corresponding to the particular service function forwarder to obtain only one trace packet and to keep only one trace packet at next hop. When the ECMP arrangement is determined to exist in different service function forwarders, the trace managing module 40 creates the normal trace packet flow and dropped trace packet flow according to the data of the forwarding policy table, thereby enabling the trace managing module 40 to drop extra trace packets, to enable each service function corresponding to the particular service function forwarder to obtain only one trace packet and to keep only one trace packet at next hop.

At block 205, the report managing module 50 collects the trace reports, records the data of the trace reports to the aggregate trace table.

At block 206, the report managing module 50 generates the SFC trace graph according to the aggregate trace table.

At block 207, the report managing module 50 determines whether the service function fails or the service function path fails according to the aggregate trace table. If yes, the method goes to block 107; if no, the method goes to end.

At block 208, the report managing module 50 notifies the client 70 of the failed information. Thus, the client 70 can adopt a measure to deal with the failed information according to the failed information.

Figure 7:
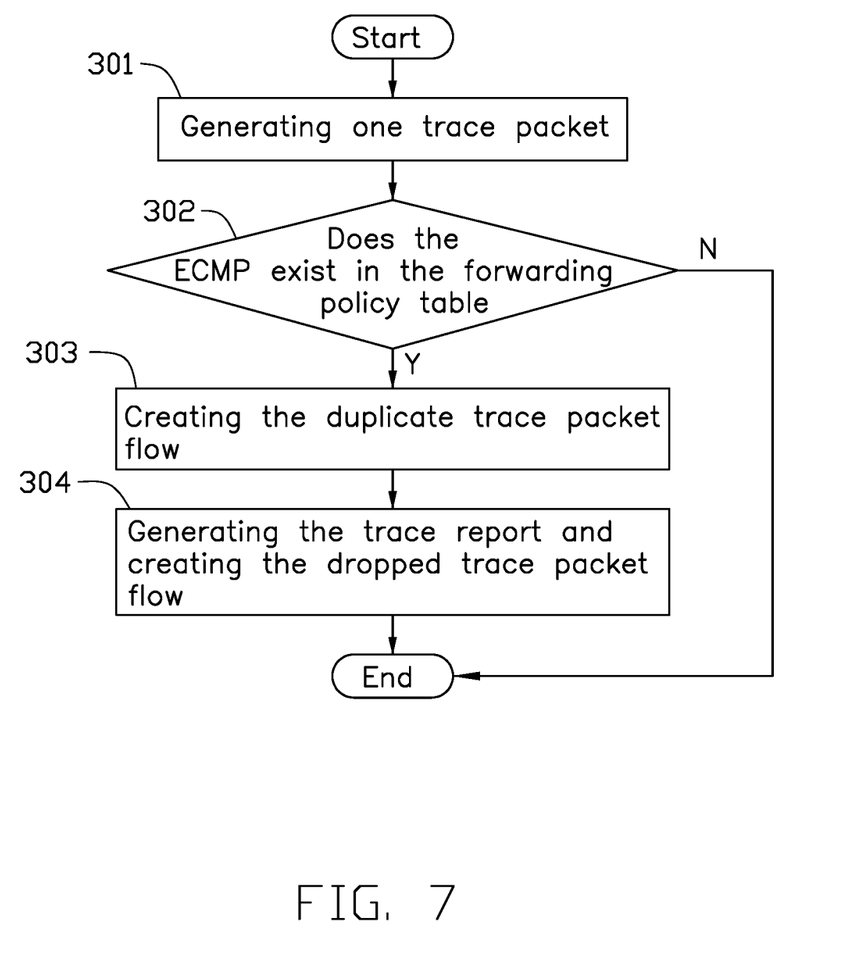
FIG. 7 is a flowchart of one exemplary embodiment of a trace managing module of the SFC system when determining whether an ECMP arrangement exists in one particular service function forwarder.

FIG. 7 illustrates a flowchart of a first method in accordance with an example embodiment when the ECMP arrangement is determined to exist in the service function forwarder. The first method can begin at block 301.

At block 301, the SDN controller 20 generates one trace packet. Specifically, the SDN controller 20 generates one predetermined trace packet when receiving the trace request triggered by the client 70. The SDN controller 20 can identify the predetermined trace packet. The SDN controller 20 is configured to generate a trace packet when receiving a trace request triggered by the client 70. The trace packet is a data packet predetermined by the SDN controller 20 which can be identified by the he SDN controller 20.

At block 302, the trace managing module 40 determines whether the ECMP arrangement exists in the forwarding policy table. If yes, the method goes to block 303; if no, the method goes to end. Specifically, FIG. 2 illustrates that ECMP arrangement is determined to exist when the SFF1 is determined to transmit data to the SFF2 through the first path and the SFF1 is determined to transmit data to the SFF3 through the second path. The trace managing module 40 determines the ECMP arrangement exists in the SFF2 and SFF3 when the SFF2 is determined to transmit data to the SFF4 through the third path and the SFF3 is determined to transmit data to the SFF4 through the fourth path.

At block 303, the SDN controller 20 creates the duplicate trace packet flow according to the forwarding policy table.

At block 304, the SDN controller 20 creates the trace report and dropped trace packet flow according to the forwarding policy table.

Figure 8:
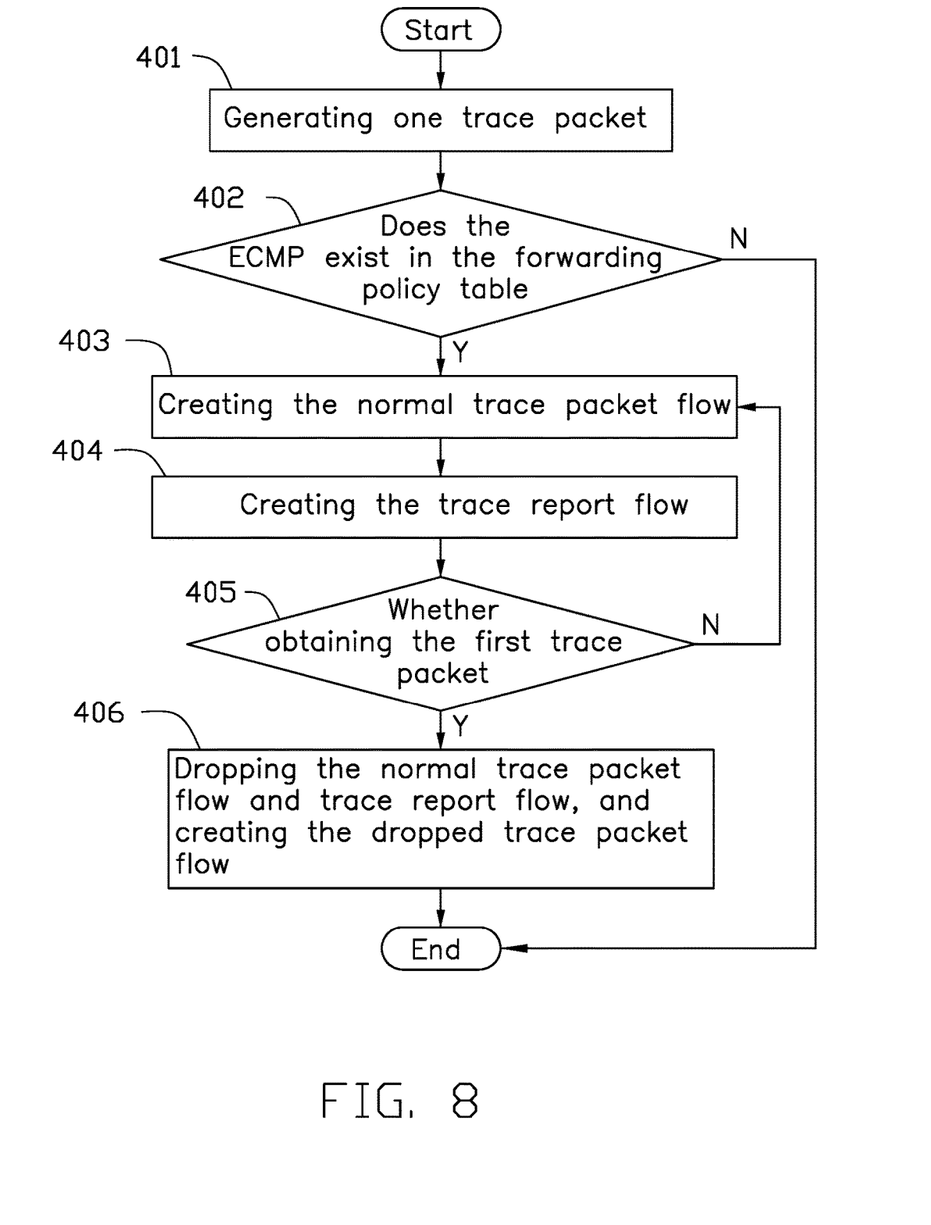
FIG. 8 is a flowchart of one exemplary embodiment of the trace managing module when determining that the ECMP arrangement exists in different service function forwarders.

FIG. 8 illustrates a flowchart of a second method in accordance with an example embodiment when the ECMP arrangement is determined to exist in different the service function forwarders. The second method can begin at block 401.

At block 401, the SDN controller 20 generates one trace packet. Specifically, the SDN controller 20 generates one trace packet when receiving a trace request triggered by the a client 70. The predetermined trace packet can be identified by the he SDN controller 20.

At block 402, the trace managing module 40 determines whether the ECMP arrangement exists in the forwarding policy table. If yes, the method goes to block 403; if no, the method goes to end. Specifically, FIG. 2 illustrates that the trace managing module 40 determines the ECMP arrangement exists when the SFF2 is determined to transmit data to the SFF4 through the third path and the SFF3 is determined to transmit data to the SFF4 through the fourth path.

At block 403, the SDN controller 20 creates one normal trace packet flow according to the first trace packet.

At block 404, the SDN controller 20 creates the trace report.

At block 405, the SDN controller 20 determines whether obtains a first trace packet. If yes, the method goes to block 406; if no, the method goes to block 403.

At block 406, the SDN controller 20 drops the normal trace packet flow and trace report flow, and creates the dropped trace packet flow. Specifically, FIG. 2 illustrates that he SDN controller 20 drops extra trace packets, thereby enabling the SFF4 to obtain the first trace packet, when the SFF4 obtains a first trace packet from the SFF2 or SFF3.

Figure 9:
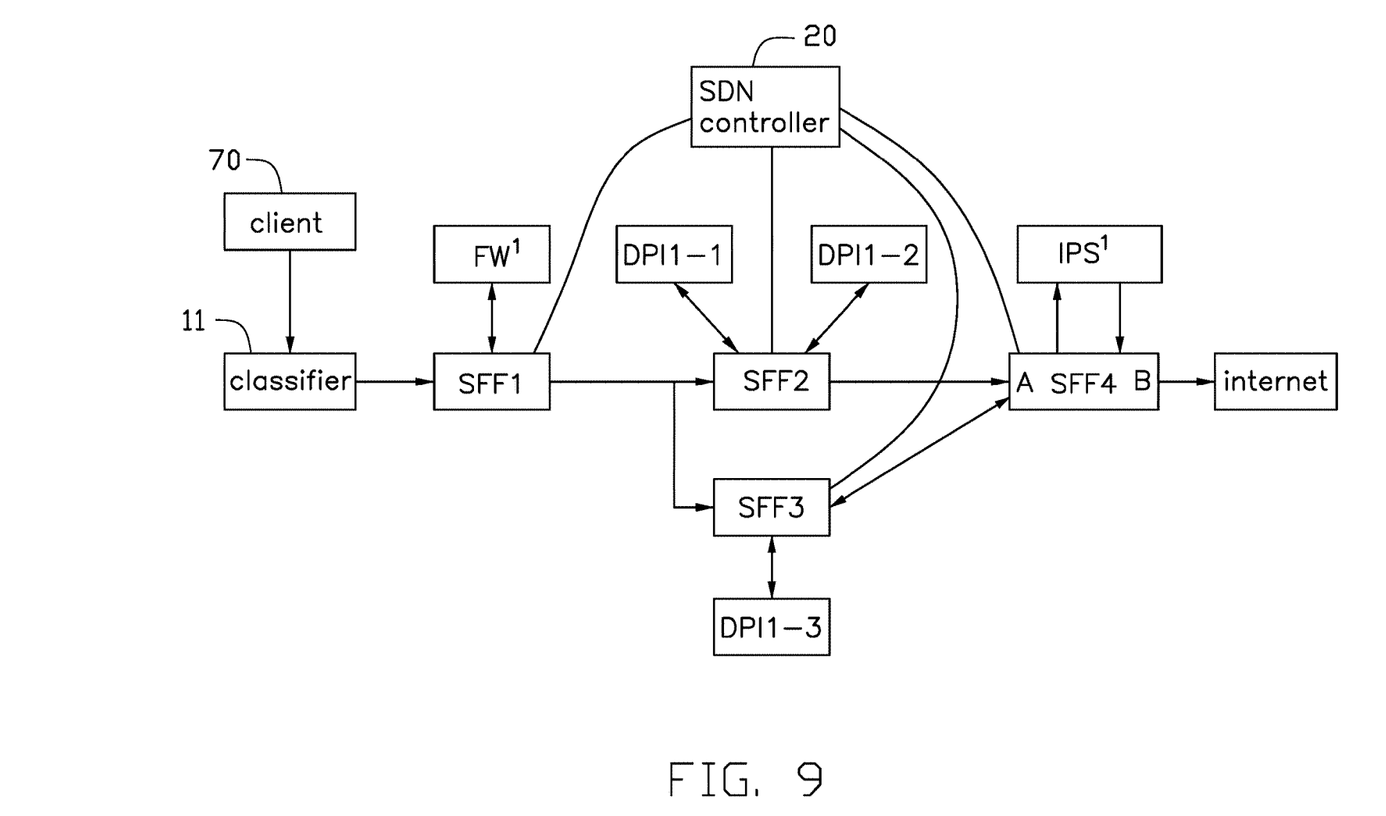
FIG. 9 is a diagrammatic view of a second exemplary embodiment of the SFC system of FIG. 1.

FIG. 9 illustrates that in another exemplary embodiment, the SF unit 12 comprises four service function forwarders, namely, an SFF1 locate at the first hop, an SFF2 and an SFF3 locate at the second hop, and an SFF4 locate at the third hop, the SF unit 12 comprises five service functions, namely, a FW1 corresponding to the SFF1, a DPI 1-1 and a DPI 1-2 the corresponding to the SFF2, a DPI 1-3 corresponding to the SFF3, and an IPS1 corresponding to the SFF4. The SFF4 comprises a port A and a port B, the trace packet transmitted by the SFF2 and the trace packet transmitted by the SFF3 are transmitted to the SFF4 from the port A of the SFF4, and are output from the port B of the SFF4, to be transmitted to the internet from the SFF4.

Figure 10:
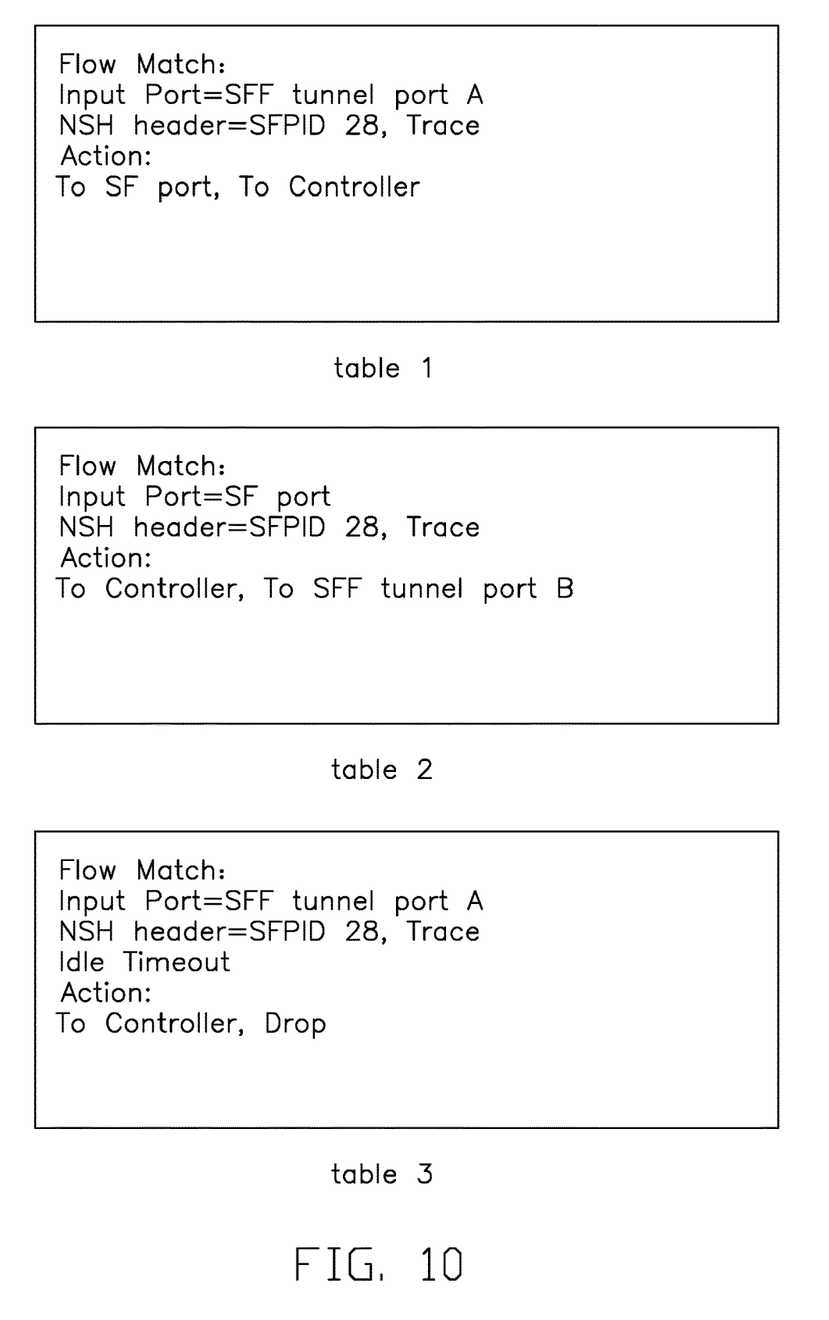
FIG. 10 shows three tables of one exemplary embodiment of information of a normal trace packet flow, a trace report flow, and a dropped trace packet flow.

FIG. 10 illustrates three tables of one exemplary embodiment of information of the normal trace packet flow, the trace report flow, and the dropped trace packet flow. Table 1 illustrates the information of the normal trace packet flow as follows: "Input Port=SFF tunnel port A" represents the SFF tunnel port A is the input port, "NSH header=SFPID 28, trace" represents the SFPID 28 and the trace are added to the NSH of the trace packet, and "Action: To SF port, To Controller" represents the action is the normal trace packet flow passing through the SF port and the SDN controller 20.

Table 2 illustrates the information of the trace report as follows: 'Input Port=SF port' represents the SF port is the input port, "NSH header=SFPID 28 represents, Trace" represents the SFPID 28 and the trace are added to the NSH of the trace packet, and "Action: To Controller, To SFF tunnel port B" represents the action is the trace report flow passing through the SDN controller 20 and the SFF tunnel port B.

Table 3 illustrates the information of the dropped trace packet flow as follows: "Input Port=SFF tunnel port A" represents the SFF port A is the input Port, "NSH header=SFPID 28, Trace" represents the SFPID 28 and the trace are added to the NSH of the trace packet, "Action: To Controller, Drop" represents the action is the dropping trace report flow passing through the SDN controller 20 and the dropping the trace packet.

Figure 11:
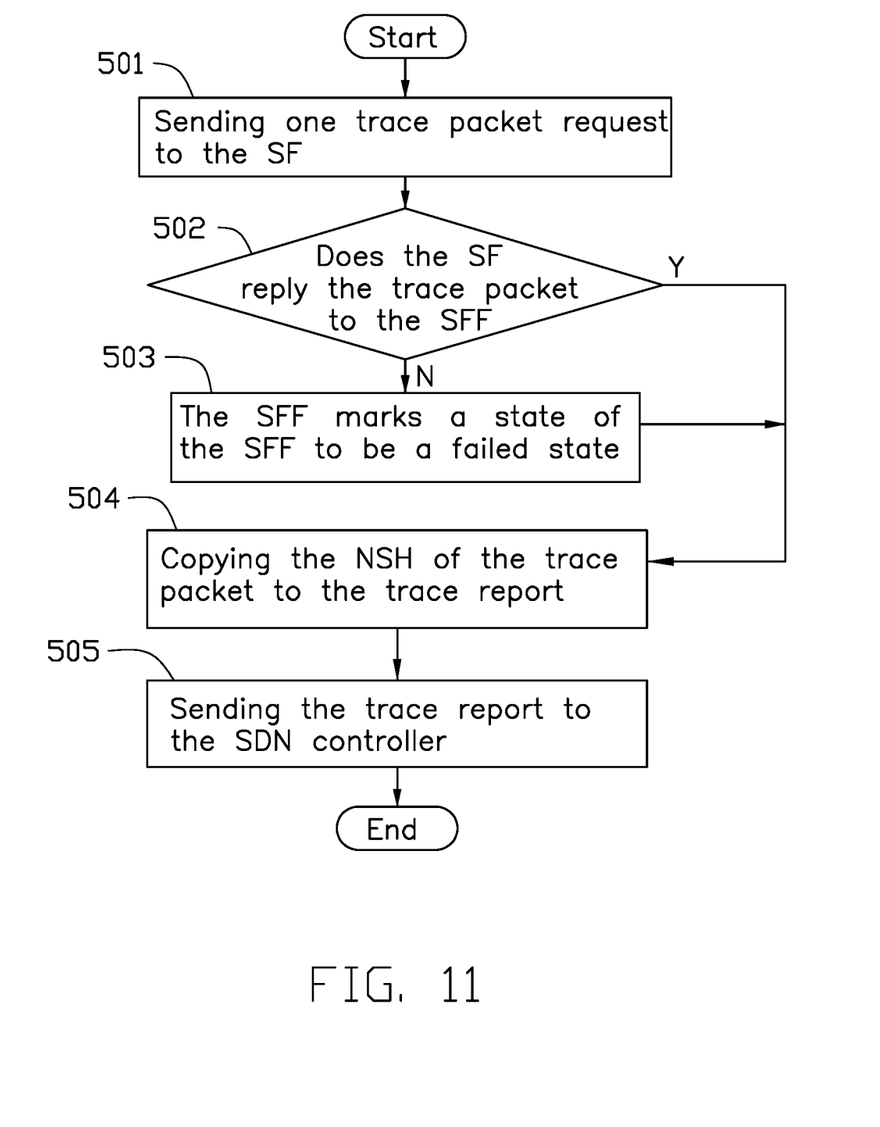
FIG. 11 is a flowchart of one exemplary embodiment of managing a trace report by a report managing module.

FIG. 11 illustrates a flow chart of one exemplary embodiment of a report managing module managing the trace report.

At block 501, the SFF sends one trace packet request to the SF.

At block 502, the report managing module 50 determines the SF replies the trace packet to the SFF. If yes, the method goes to block 504; if no, the method goes to block 503.

At block 503, the report managing module 50 marks a state of the SFF to be a failed state.

At block 504, the report managing module 50 copies the NSH of the trace packet to the trace report through the service function forwarder. In one exemplary embodiment, the NSH of the trace report corresponding to the trace packet NSH comprises version information, a length of the trace packet, protocol information (such as OAM protocol), ECMP information (indicating if this trace should support ECMP), Trace ID(an identification of the trace packet), SF state (a normal state or a failed state), reserved bit, and trace index.

At block 505, the SFF sends the trace report to the SDN controller 20.

FIG. 9 illustrates that, in the second exemplary embodiment, the trace packet NSH corresponding to the SFF4 is as follows: SFPID being 28 represents an identification of the service function path (SFP) is 28, Trace ID being 1 represents trace packet is the first trace packet, $SFF^4 IP$ being (10. 0. 1. 51) represents an IP address of the service function forwarder (SFF) is (10. 0. 1. 51), $SF^3$ being IPS represents corresponding to the service function ($SF^3$) is IPS, SF IP being (10. 0. 1. 61) represents an IP address of the service function (SF) is (10. 0. 1. 61), State being Fail represents at least one of the states of the service function and service function path is failed, Number Index being 3 represents a trace index value is 3.

In the SFC system and the trace tracking method, when the ECMP arrangement exists in the service function chaining, the SDN controller 20 generates only one predetermined trace packet, the trace managing module 40 can copy a plurality of trace packets according to the number of the equal-cost multipath and drop extra trace packets, to keep only one trace packet at next hop SFF, thus, each equal-cost multipath transmit only one trace packet, thereby enabling the SDN controller 20 to obtain the failed equal-cost multipath according to the trace report when any equal-cost multipath is failed, the client 70 can obtain the failed information according to the report managing module 50, the client 70 can deal with the failed information.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure to the full extent indicated by the broad general meaning of the terms in which the appended claims are expressed.

What is claimed is:

1. A service function chaining system comprising:
a service function chaining (SFC) module having:
a classifier;
a service function (SF) having at least one SF; and
a service function forwarder (SFF) having at least one SFF; and
a software defined network (SDN) controller in communication with the SFC module through network connections, the SDN controller having a trace managing module;
wherein the SDN controller is configured to:
generate a trace packet when receiving a trace request is triggered by a client; and
send the trace packet to the SFC module;
wherein the trace packet is classified by the classifier and is sent to the SDN controller;
wherein the classified trace packet is transmitted to the SF or next hop SFF after passing through a first hop SFF;
wherein the trace managing module determines whether equal cost multipath (ECMP) arrangement exists according to the classified trace packet;
wherein the trace managing module creates a duplicate trace packet flow and keeps only one trace packet at next hop when the ECMP arrangement is determined to exist in one particular SFF;
wherein the trace managing module creates a normal trace packet flow and a dropped trace packet flow, and keeps only one trace packet at next hop when the ECMP arrangement is determined to exist in different service function forwarders.

2. The service function chaining system of claim 1, wherein the SDN controller further comprises a report managing module, wherein the trace managing module creates a report trace packet flow when the ECMP arrangement is determined to exist, generates a trace report, and sends the trace report to the report managing module through the trace packet flow.

3. The service function chaining system of claim 2, wherein the report managing module collects the trace report and records data of the trace report to an aggregate trace table.

4. The service function chaining system of claim 3, wherein the data of the aggregate trace table comprises an identification of the service function path (SFP), an identification of the trace packet, an internet protocol (IP) address of the service function forwarder (SFF), an IP address of the service function (SF), a state of the SF or SFP, and a hop of the SFF.

5. The service function chaining system of claim 3, wherein the report managing module generates an SFC trace graph according to the aggregate trace table, data of the SFC trace graph comprises an identification of the service function path (SFP), an identification of the trace packet, an internet protocol (IP) address of the service function forwarder (SFF), an IP address of the service function (SF), and a state of the SF or SFP.

6. The service function chaining system of claim 2, wherein the report managing module copies a network service header (NSH) of the trace packet to the trace report through the service function forwarder, an NSH of the trace report comprises version information, protocol information, ECMP information, an identification of the trace packet, a state of the SF, a reserved bit, and a trace index.

7. The service function chaining system of claim 1, wherein the trace packet comprises an NSH, the NSH of the trace packet comprises ECMP information, an identification of the trace packet, a state of the SF, a reserved bit, and a trace index.

8. The service function chaining system of claim 1, wherein the SDN controller further comprises a topology calculating module, the topology calculating module provides a forwarding policy table by calculating, the SFF stores the forwarding policy table, the trace managing module is configured to analyze the forwarding policy table of the SFF, the trace managing module determines the ECMP arrangement exists according to data of the forwarding policy table when the SFF is determined to exist in one particular SF.

9. An SDN controller communicated with a service function chaining (SFC) module through network connections, and comprising:
a trace managing module; and
a report managing module;
wherein the SFC module comprising:
a classifier;
a service function (SF) having at least one SF; and
a service function forwarder (SFF) having at least one SFF, the least one SFF in communication with the at least one SF through the network connections;
wherein the classifier communicates with a first hop SFF through the network connection;
wherein the SDN controller is configured to:
generate a trace packet when receiving a trace request triggered by a client; and
send the trace packet to the SFC module;
wherein the trace packet is classified by the classifier and is sent to the SDN controller;
wherein the classified trace packet is transmitted to the SF or next hop SFF after passing through the first hop SFF;
wherein the trace managing module determines whether equal cost multipath (ECMP) arrangement exists according to the classified trace packet;
wherein the trace managing module creates a duplicate trace packet flow and a report trace packet flow, and keeps only one trace packet at next hop when the ECMP arrangement is determined to exist in one particular SFF;
wherein the trace managing module creates a normal trace packet flow, dropped trace packet flow, and a report trace packet flow, and keeps only one trace packet at next hop, when the ECMP arrangement is determined to exist in different service function forwarders;
wherein the report managing module collects the trace report and records the data of the trace report to an aggregate trace table.

10. The SDN controller of claim 9, wherein the data of the aggregate trace table comprises an identification of the service function path (SFP), an identification of the trace packet, an internet protocol (IP) address of the service function forwarder (SFF), an IP address of the service function (SF), a state of the SF or SFP, and a hop of the SFF.

11. The SDN controller of claim 9, wherein the report managing module generates an SFC trace graph according to the aggregate trace table, the data of the SFC trace graph comprises an identification of the service function path (SFP), an identification of the trace packet, an internet protocol (IP) address of the service function forwarder (SFF), an IP address of the service function (SF), and a state of the SF or SFP.

12. The SDN controller of claim 9, wherein the report managing module copies an NSH of the trace packet to the trace report through the service function forwarder, an NSH of the trace report comprises ECMP information, an identification of the trace packet, a state of the SF, a reserved bit, and a trace index.

13. A trace tracking method comprising:
generating one trace packet after receiving a trace request from a client;
sending the trace packet to an SFC module;
classifying the trace packet;
sending the classified trace packet to a trace managing module of an SDN controller;
determining whether an ECMP arrangement exists in a service function chaining;
creating a duplicate trace packet flow to keep only one trace packet at next hop when determining the ECMP arrangement exists in one particular service function forwarder of the service function chaining; and
creating a normal trace packet flow and a dropped trace packet flow to keep only one trace packet at next hop when determining the ECMP arrangement exists in different service function forwarders of the service function chaining.

14. The trace tracking method of claim 13, wherein the step of determining whether the ECMP arrangement exists in the service function chaining comprising:
analyzing a forwarding policy table of the service function forwarder; and
obtaining the ECMP when the particular SF communicates with the service function forwarders.

15. The trace tracking method of claim 13, further comprising:
creating a trace report and sending the trace report to the report managing module through the trace report flow, when determining the ECMP arrangement exists in the particular service function forwarder; and
creating a trace report and sending the trace report to the report managing module through the trace report flow, when determining the ECMP arrangement exists in different service function forwarders.

16. The trace tracking method of claim 15, wherein after the step of creating the trace report and sending the trace report to the report managing module comprises:
collecting all trace reports; and
recording data of the trace report to an aggregate trace table.

17. The trace tracking method of claim 16, wherein after the step of recording the data of the trace report to the aggregate trace table comprises a step of generating an SFC trace graph according to the aggregate trace table.

18. The trace tracking method of claim 15, wherein after the step of creating the trace report and sending the trace report to the report managing module comprises:
sending one trace packet request to the SF; and
determining whether the SF replies to the SFF.

19. The trace tracking method of claim 18, wherein after the step of sending one trace packet request to the SF comprises:
marking a state of the SFF in the trace report to be a failed state when determining the SF does not reply to the SFF; and
copying an NSH of the trace packet to the trace report through the service function forwarder.

20. The trace tracking method of claim 19, wherein the NSH of the trace report comprises ECMP information, an identification of the trace packet, a state of the SF, a reserved bit, and a trace index.

* * * * *